(12) United States Patent
Osumi et al.

(10) Patent No.: US 7,931,741 B2
(45) Date of Patent: Apr. 26, 2011

(54) GAS-INSULATED SWITCHGEAR APPARATUS AND GAS FILTER DEVICE

(75) Inventors: Masanori Osumi, Tokyo (JP); Kazumichi Hata, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 324 days.

(21) Appl. No.: 12/213,084

(22) Filed: Jun. 13, 2008

(65) Prior Publication Data

US 2009/0166332 A1 Jul. 2, 2009

(30) Foreign Application Priority Data

Dec. 28, 2007 (JP) ................................. 2007-341039

(51) Int. Cl.
*B01D 53/02* (2006.01)

(52) U.S. Cl. ................ 96/134; 96/108; 96/135; 95/141; 218/68

(58) Field of Classification Search .................. 96/108, 96/134, 135; 95/141; 218/68
See application file for complete search history.

(56) References Cited

U.S. PATENT DOCUMENTS

| | | | | |
|---|---|---|---|---|
| 3,512,939 A | * | 5/1970 | Litty | 422/86 |
| 3,604,872 A | * | 9/1971 | Wilson | 218/68 |
| 3,653,643 A | * | 4/1972 | Tucker | 261/56 |
| 3,681,549 A | * | 8/1972 | Schmitz et al. | 218/83 |
| 3,849,618 A | * | 11/1974 | Wagner et al. | 218/43 |
| 5,401,406 A | * | 3/1995 | Johnson et al. | 210/323.2 |
| 5,483,031 A | * | 1/1996 | Matsuda | 218/48 |
| 5,516,349 A | * | 5/1996 | Bouthillier | 96/381 |
| 5,713,973 A | * | 2/1998 | Yoshida et al. | 55/497 |
| 6,016,053 A | * | 1/2000 | Yakymyshyn et al. | 324/96 |
| 6,395,066 B1 | * | 5/2002 | Tanihara et al. | 95/47 |
| 2004/0045432 A1 | * | 3/2004 | Yamamoto et al. | 95/48 |
| 2004/0123993 A1 | * | 7/2004 | Uchii et al. | 174/17.05 |
| 2005/0269254 A1 | * | 12/2005 | Roitman | 210/252 |
| 2007/0158106 A1 | * | 7/2007 | Tilliette et al. | 174/652 |
| 2008/0049383 A1 | * | 2/2008 | Fukunaga et al. | 361/612 |

FOREIGN PATENT DOCUMENTS

DE 4312664 C1 * 7/1994
JP 5-91631 A 4/1993

OTHER PUBLICATIONS

Translation of DE 4312664 C1, Jul. 1994, Germany, Laessle et al.*

* cited by examiner

Primary Examiner — Robert J Hill, Jr.
Assistant Examiner — Christopher P Jones
(74) Attorney, Agent, or Firm — Buchanan Ingersoll & Rooney PC

(57) ABSTRACT

A gas tank is hermetically filled with an insulating gas. A gas filling opening is provided on the gas tank, which includes a flange at its end. A gas filter device is fixed to the gas flange of the gas filling opening. The gas filter device includes a gas filter formed with a porous insulating material having pores with a diameter in a range from tens of micrometers to hundreds of micrometers. The gas filter has stability against the insulating gas and a decomposition product of the insulating gas.

13 Claims, 4 Drawing Sheets

GAS-INSULATED SWITCHGEAR APPARATUS AND GAS FILTER DEVICE

BACKGROUND OF THE INVENTION

1. Field of the Invention

The present invention relates to a gas-insulated switchgear apparatus and a gas filter device for the gas-insulated switchgear apparatus.

2. Description of the Related Art

Japanese Patent Application Laid-open No. H5-91631 discloses a technique of filling an insulating gas in a gas-insulated switchgear apparatus. The conventional gas-insulated switchgear apparatus includes a plurality of metallic chambers, each of which is partitioned by an insulating spacer and hermetically filled with an insulating gas. A gas valve is arranged at a gas filling opening of each metallic gas chamber. The gas valve is opened at the time of filling or evacuating an insulating gas. That is, the gas valve is opened when the gas-insulated switchgear apparatus is connected to a gas filling apparatus or a gas evacuating apparatus through a gas pipe.

Moreover, the gas-insulated switchgear apparatus includes a bypass piping for performing central monitoring of the gas pressure in metallic chambers. The bypass piping has a valve arranged between each pair of two neighboring metallic chambers. Each valve is usually kept open during the central monitoring but is closed when the gas pressure in each metallic gas chamber is to be monitored individually.

However, when the gas valve is opened to fill an insulating gas in the abovementioned gas-insulated switchgear apparatus, there is a possibility that foreign objects of equal to or larger than about three millimeters in length enter therein from the gas filling opening. Such foreign objects affect the insulating properties of the gas-insulated switchgear apparatus and may cause an insulation breakdown.

To avoid such a problem, some conventional gas-insulated switchgear apparatuses are equipped with a gas filter device for filtering an insulating gas being filled. However, a gas filter device may not prevent all foreign objects accumulated in a gas pipe, which connects a gas-insulated switchgear apparatus and a gas filling apparatus, from entering into in the gas-insulated switchgear apparatus.

Moreover, if, e.g., a grounding fault occurs in one of the metallic chambers, there is a possibility that foreign objects, decomposition product, or a cracked gas generated in the faulty metallic gas chamber flows into a neighboring metallic gas chamber through the bypass piping. That is because the valves in the bypass piping are usually kept open. As a result, it becomes necessary to carry out the appropriate gas treatment in all the contaminated metallic chambers.

SUMMARY OF THE INVENTION

It is an object of the present invention to at least partially solve the problems in the conventional technology.

According to an aspect of the present invention, there is provided a gas-insulated switchgear apparatus including a gas tank that is hermetically filled with an insulating gas; a gas filling opening provided on the gas tank, the gas filling opening including a flange at its end; and a gas filter device that is fixed to the gas flange of the gas filling opening, the gas filter device including a gas filter formed with a porous insulating material having pores with a diameter in a range from tens of micrometers to hundreds of micrometers. The gas filter has stability against the insulating gas and a decomposition gas of the insulating gas.

Furthermore, according to another aspect of the present invention, there is provided a gas-insulated switchgear apparatus including a gas tank that is hermetically filled with an insulating gas; a conductor that is arranged inside the gas tank; a gas partitioning spacer that partitions the gas tank into a plurality of gas chambers along a longitudinal direction of the conductor and provides an insulating support to the conductor; a bypass piping that connects neighboring gas chambers to each other; a gas valve that is arranged in the bypass piping; and a gas filter device that is fixed to the gas flange of the gas filling opening, the gas filter device including a gas filter formed with a porous insulating material having pores with a diameter in a range from tens of micrometers to hundreds of micrometers. The gas filter has stability against the insulating gas and a decomposition gas of the insulating gas.

Moreover, according to still another aspect of the present invention, there is provided a gas-insulated switchgear apparatus including a gas tank that is hermetically filled with an insulating gas; a conductor that is arranged inside the gas tank; a gas partitioning spacer that partitions the gas tank in a plurality of gas chambers along a longitudinal direction of the conductor and provides an insulating support to the conductor; a bypass piping that connects a first gas chamber and a second gas chamber neighboring to each other; a first gas evacuating opening that extends from the bypass piping and is used to evacuate the insulating gas from the first gas chamber; a second gas evacuating opening that extends from the bypass piping and is used to evacuate the insulating gas from the second gas chamber; a gas filling opening that extends from the bypass piping and is used to fill the insulating gas into the first gas chamber and the second gas chamber; a first gas filter device arranged in a first path in the bypass piping between the gas filing opening and the first gas chamber, the first gas filter device including a first gas filter formed with a porous insulating material having pores with a diameter in a range from tens of micrometers to hundreds of micrometers, the first gas filter having stability against the insulating gas and a decomposition gas of the insulating gas; a second gas filter device arranged in a second path in the bypass piping between the gas filing opening and the second gas chamber, the second gas filter device including a second gas filter formed with a porous insulating material having pores with a diameter in a range from tens of micrometers to hundreds of micrometers, the second gas filter having stability against the insulating gas and a decomposition gas of the insulating gas; and an adsorbent that is arranged in each of the first gas chamber and the second gas chamber. The insulating gas is filled in the first gas chamber from the gas filling opening through the first gas filter device. The insulating gas is filled in the second gas chamber from the gas filling opening through the second gas filter device. The insulating gas in the first gas chamber is directly evacuated from the first gas evacuating opening. The insulating gas in the second gas chamber is directly evacuated from the second gas evacuating opening.

Furthermore, according to still another aspect of the present invention, there is provided a gas filter device that is used in a gas-insulated switchgear apparatus at a time of filling an insulating gas. The gas filter device is fixed to a gas flange that is arranged at a gas filling opening of the gas-insulated switchgear apparatus. The gas filter device includes a gas filter that is formed with a porous insulating material having pores with a diameter in a range from tens of micrometers to hundreds of micrometers, the gas filter having stability against the insulating gas and a decomposition gas of the insulating gas; a first plate that is substantially identical in shape to the gas flange; a second plate that is substantially identical in shape to the gas flange; a plurality of O-rings used as gaskets; and a plurality of bolts used as fasteners. The gas filter is sandwiched between the first plate and the second plate through the O-rings. The first plate and the second plate are fastened in an air-tight manner by the bolts.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1A:
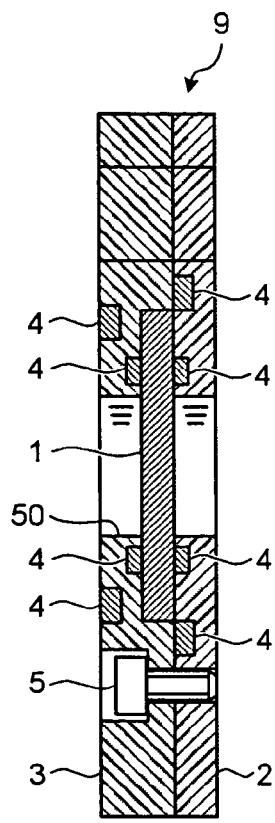
FIG. 1A is a cross-sectional view of a gas filter device according to a first embodiment of the present invention.
Figure 1B:
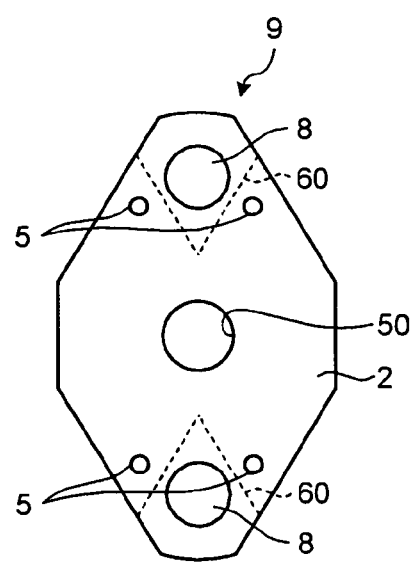
FIG. 1B is a plain view of the gas filter device.
Figure 2:
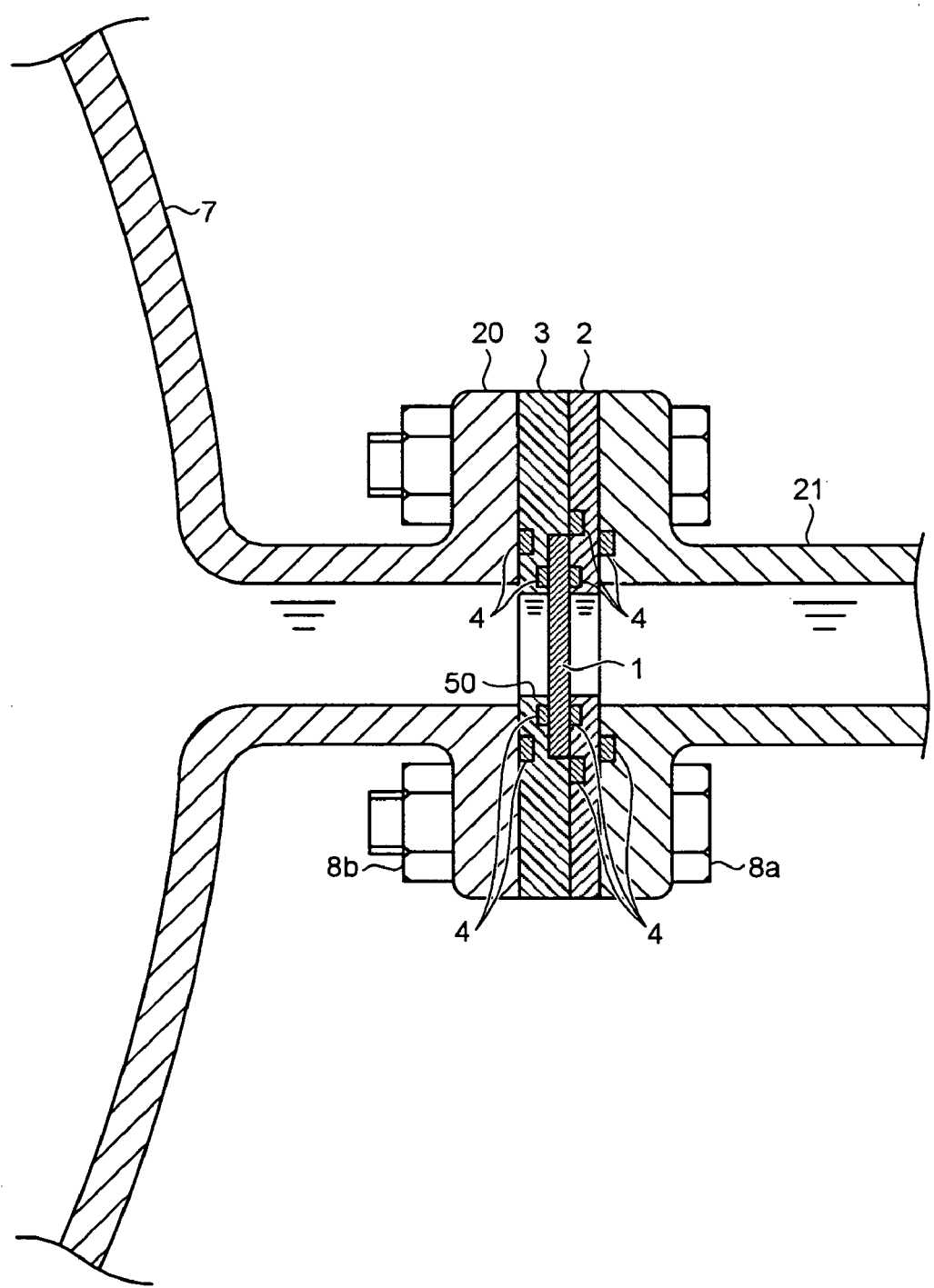
FIG. 2 is a partial cross-sectional view of a gas-insulated switchgear apparatus according to the first embodiment.

FIG. 1A is a cross-sectional view of a gas filter device 9 according to a first embodiment of the present invention. FIG. 1B is a plain view of the gas filter device 9. FIG. 2 is a partial cross-sectional view of a gas-insulated switchgear apparatus according to the first embodiment. As shown in FIG. 2, the gas filter device 9 is fixed to a gas flange 20 of the gas-insulated switchgear apparatus.

The gas filter device 9 includes a gas filter 1 that is sandwiched between a first plate 2 and a second plate 3 through a plurality of O-rings 4. The gas filter 1 is made of a porous insulating material that is stable against an insulating gas or a decomposition product thereof. The pores on the gas filter 1 have a diameter in the range from several tens of micrometers to a few hundred micrometers, and form a continuous pore in a three-dimensional net-like fashion. The first plate 2 and the second plate 3 are fastened in an air-tight manner by a plurality of bolts 5.

A gas flow through-hole 50 is arranged between the first plate 2 and the second plate 3. When an insulating gas flows through the gas flow through-hole 50, the gas filter 1 filters foreign objects having diameter bigger than that of the gas filter 1 and length more than one millimeter. The first plate 2 and the second plate 3 are, e.g., metal plates. The gas filter device 9 further includes a plurality of bolt holes 8 (shown inside dotted-line portions 60 in FIG. 1B). A bolt is inserted in each bolt hole 8 for fixing the gas filter device 9 to the gas flange 20. As described above, the bolts 5 are used to bolt down the gas filter device 9. Meanwhile, the dotted-line portions 60 in FIG. 1B is not shown in the cross-sectional view of the gas filter device 9 in FIG. 1A.

The gas filter 1 can be a sintered resin filter of an insulating resin such as polypropylene that has high insulating properties and is stable against, e.g., a cracked gas of an insulating gas such as sulfur hexafluoride ($SF_6$) gas. However, a material having identical properties to that of polypropylene can also be used in the gas filter 1. Moreover, stability against the cracked gas is necessary to prevent deterioration of the gas filter 1 even if an accident such as an electrical short circuit occurs.

Generally, foreign objects, which get mixed in an insulating gas and may cause an insulation breakdown of the gas-insulated switchgear apparatus, have a length of equal to or larger than three millimeters (3000 micrometers) and a diameter of equal to or larger than 0.1 millimeters (100 micrometers). Thus, the gas filter 1 is made with pores of a smaller diameter to prevent such foreign objects from entering into in the gas-insulated switchgear apparatus. Although it is possible to further reduce the pore diameter for better filtering, the time for filling an insulating gas may increase thereby reducing the efficiency.

The gas filter device 9 as described above can be suitably used in a gas-insulated switchgear apparatus. Moreover, the gas filter device 9 can be transported to a location where a gas-insulated switchgear apparatus is installed and attached thereto at the time of filling an insulating gas.

Given below is the description of the gas-insulated switchgear apparatus with reference to FIG. 2. The gas filter device 9 is attached to the gas-insulated switchgear apparatus. The gas-insulated switchgear apparatus includes a gas tank 7, a part of which protrudes to form a gas filling opening. The gas flange 20 is arranged at the end of the gas filling opening. The gas filter device 9 is fixed to the gas flange 20. In other words, the gas filter device 9 is arranged between the gas flange 20 and a gas pipe 21, which is used at the time of filling an insulating gas into the gas tank 7. The gas flange 20, the gas filter device 9, and the gas pipe 21 are fastened by using a bolt 8a and a nut 8b through the O-rings 4. The gas tank 7 is an electrically grounded metallic gas chamber.

The shape of the first plate 2 and the second plate 3 is substantially identical to that of the gas flange 20. One O-ring 4 is inserted between the gas flange 20 and the first plate 2. Similarly, one O-ring 4 is inserted between the second plate 3 and the gas filter 1, between the gas filter 1 and the first plate 2, between the first plate 2 and the second plate 3, and between the first plate 2 and the gas pipe 21. Some of the constituent elements of the gas filter device 9 (e.g., the bolts 5) are not shown in FIG. 2 for simplification.

Thus, after fixing the gas filter device 9 to the gas flange 20, an insulating gas is filled into the gas tank 7 through the gas pipe 21. After performing an experiment of filling an insulating gas by using the gas filter 1, it was verified that the time for filling an insulating gas does not increase by a significant amount as compared to a case when no gas filter is used. It was also verified that foreign objects, which are bigger than the size of the pores on the gas filter 1 or have a length of equal to or larger than three millimeters, do not enter into the gas tank 7.

Thus, it is possible to prevent foreign objects accumulated in the gas pipe 21 from entering into the gas tank 7 thereby avoiding a possible insulation breakdown of the gas-insulated switchgear apparatus.

The gas filter 1 is thick enough to withstand the flow pressure of an insulating gas flowing therethrough to the gas tank 7. However, even if by any chance the gas filter 1 gets damaged, the insulating properties of the gas-insulated switchgear apparatus are not affected because the gas filter 1 is made of an insulating material such as insulating resin.

Figure 3:
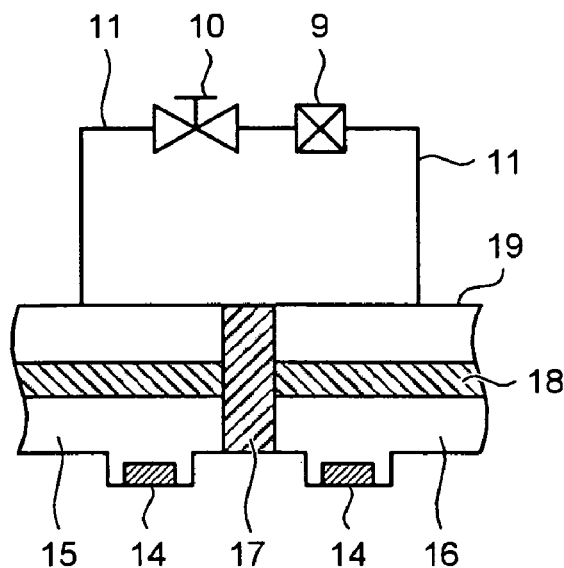
FIG. 3 is a gas schematic diagram of a gas-insulated switchgear apparatus according to a second embodiment of the present invention.

FIG. 3 is a gas schematic diagram of a gas-insulated switchgear apparatus according to a second embodiment of the present invention. The gas-insulated switchgear apparatus according to the second embodiment includes a gas tank 19 that is hermetically filled with an insulating gas such as the $SF_6$ gas. The gas tank 19 further includes a conductor 18 and an insulating spacer 17. The insulating spacer 17 provides an insulating support to the conductor 18 and partitions the gas tank 19 in a first gas chamber 15 and a second gas chamber 16 along the longitudinal direction of the conductor 18. It is also possible to partition the gas tank 19 into more than two gas chambers.

Each of the first gas chamber 15 and the second gas chamber 16 includes an adsorbent 14 for adsorbing the cracked gas. The adsorbent 14 can be, e.g., a calcined mixture of synthetic zeolite (also known as sodium aluminosilicate) and clay mineral.

The gas-insulated switchgear apparatus further includes a bypass piping 11 arranged to bypass the first gas chamber 15 and the second gas chamber 16. The bypass piping 11 includes a gas valve 10 and a gas filter device 9. The gas filter device 9 has an identical structure to that according to the first embodiment. The bypass piping 11 monitors the gas pressure in the first gas chamber 15 and the second gas chamber 16.

Usually, the gas valve 10 is kept open such that the bypass piping 11 can perform central monitoring of the gas pressure in the first gas chamber 15 and the second gas chamber 16. Meanwhile, even if an accident occurs in, e.g., the first gas chamber 15 due to a flash-over phenomenon or a grounding fault, foreign objects such as decomposition product or electrically conductive materials generated due to the accident do not enter into the second gas chamber 16 because of the gas filter device 9 arranged in the bypass piping 11. The pores on a gas filter 1 in the gas filter device 9 have a diameter in the range from several tens of micrometers to a few hundred micrometers. That helps in preventing foreign objects bigger than the pores from passing through the gas filter 1. Moreover, it is also possible to isolate the second gas chamber 16 from the first gas chamber 15 by closing the gas valve 10. As a result, the appropriate gas treatment remains confined to the first gas chamber 15.

Although no foreign objects pass through the gas filter 1, the cracked gas is able to pass therethrough. However, the adsorbent 14 in each of the first gas chamber 15 and the second gas chamber 16 is arranged to adsorb the cracked gas. Thus, passing of the cracked gas through the gas filter 1 does not cause much problem unless the cracked gas is extremely concentrated.

To sum up, by arranging the gas filter device 9 in the bypass piping 11, foreign objects such as decomposition product or electrically conductive materials generated in a gas chamber due to an accident can be prevented from entering into a neighboring gas chamber. Moreover, the adsorbent 14 in each gas chamber adsorbs the cracked gas. Thus, the damage due to an accident as well as the gas treatment remains confined to the faulty gas chamber.

Figure 4:
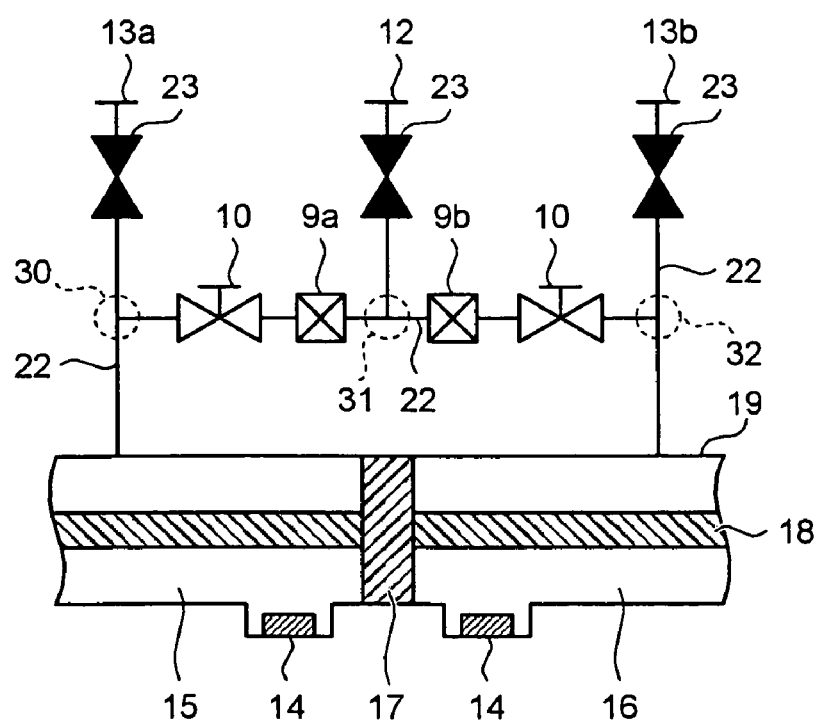
FIG. 4 is a gas schematic diagram of a gas-insulated switchgear apparatus according to a third embodiment of the present invention.

FIG. 4 is a gas schematic diagram of a gas-insulated switchgear apparatus according to a third embodiment of the present invention. The gas tank 19, the conductor 18, the insulating spacer 17, the first gas chamber 15, the second gas chamber 16, and two adsorbents 14 in the gas-insulated switchgear apparatus according to the third embodiment have an identical structure to those according to the second embodiment. Hence, description of the identical constituent elements is not repeated.

The gas-insulated switchgear apparatus further includes a bypass piping 22 and three valves 23. The bypass piping 22 includes a first three-way connector 30, a second three-way connector 31, and a third three-way connector 32, each having three end connections. A first end connection of the first three-way connector 30 is connected to the first gas chamber 15, while a second end connection of the first three-way connector 30 is connected to one end of a first of the valves 23. A first gas evacuating opening 13a is arranged on the other end of the same valve 23. Meanwhile, all of the valves 23 are usually kept open.

A third end connection of the first three-way connector 30 is connected to one end of a first of two gas valves 10. The gas valves 10 are usually kept open. The other end of the gas valve 10 is connected to one end of a first gas filter device 9a. The first gas filter device 9a has an identical structure to that according to the first embodiment. The other end of the first gas filter device 9a is connected to a first end connection of the second three-way connector 31. A second end connection of the second three-way connector 31 is connected to one end of a second of the valves 23. A gas filling opening 12 is arranged on the other end of the same valve 23.

A third end connection of the second three-way connector 31 is connected to one end of a second gas filter device 9b. The other end of the second gas filter device 9b is connected to one end of a second of the gas valves 10. The second gas filter device 9b has an identical structure to that according to the first embodiment. The other end of the gas valve 10 is connected to a first end connection of the third three-way connector 32. A second end connection of the third three-way connector 32 is connected to one end of a third of the valves 23. A second gas evacuating opening 13b is arranged on the other end of the same valve 23.

A third end connection of the third three-way connector 32 is connected to the second gas chamber 16. One adsorbent 14 is arranged in each of the first gas chamber 15 and the second gas chamber 16 for adsorbing the cracked gas. The adsorbents 14 are identical to those according to the second embodiment.

Usually, the two gas valves 10 are kept open, while the three valves 23 are kept closed such that the bypass piping 22 can perform central monitoring of the gas pressure in the first gas chamber 15 and the second gas chamber 16. Meanwhile, even if an accident occurs in, e.g., the first gas chamber 15 due to a flash-over phenomenon or a grounding fault, foreign objects such as decomposition product or electrically conductive materials generated due to the accident do not enter into the second gas chamber 16. That is because the first gas filter device 9a and the second gas filter device 9b are arranged in the bypass piping 22. Moreover, it is also possible to isolate the second gas chamber 16 from the first gas chamber 15 by closing one of the gas valves 10. As a result, the appropriate gas treatment remains confined to the first gas chamber 15.

Although no foreign objects pass through the first gas filter device 9a and the second gas filter device 9b, the cracked gas is able to pass therethrough. However, the adsorbent 14 in each of the first gas chamber 15 and the second gas chamber 16 adsorbs the cracked gas. Thus, the cracked gas entering into the second gas chamber 16 does not cause much problem unless the cracked gas is extremely concentrated.

An insulating gas can be filled into the gas-insulated switchgear apparatus by connecting a gas pipe to the gas filling opening 12 (identical configuration to that in FIG. 2) and opening the corresponding valve 23. The insulating gas then passes through the first gas filter device 9a and the second gas filter device 9b, and gets hermetically filled in the first gas chamber 15 and the second gas chamber 16, respectively. As a result, it is possible to prevent foreign objects accumulated in the gas pipe from entering into the gas-insulated switchgear apparatus thereby avoiding a possible insulation breakdown.

In the case of evacuating an insulating gas from the gas-insulated switchgear apparatus, especially during a vacuuming process, it is recommended not to pass the insulating gas through the first gas filter device 9a or the second gas filter device 9b because it is experimentally verified that vacuuming an insulating gas through a gas filter device is a time-consuming process. A gas evacuating process or a vacuuming process is performed by closing both the gas valves 10, connecting a gas pipe to each of the first gas evacuating opening 13a and the second gas evacuating opening 13b, and opening the corresponding valves 23 such that the insulating gas in the first gas chamber 15 and the second gas chamber 16 is evacuated directly without passing through the first gas filter device 9a and the second gas filter device 9b, respectively.

Figure 5:
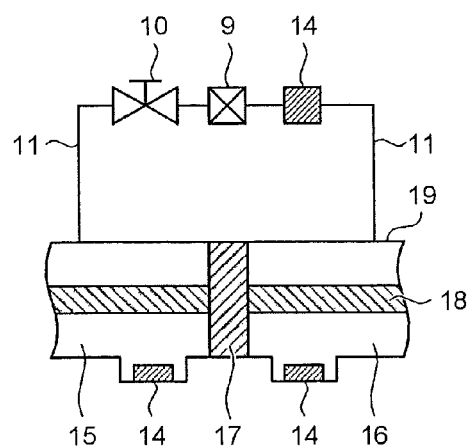
FIG. 5 is a gas schematic diagram of a gas-insulated switchgear apparatus according to a fourth embodiment of the present invention.

FIG. 5 is a gas schematic diagram of a gas-insulated switchgear apparatus according to a fourth embodiment of the present invention. The gas tank 19, the conductor 18, the insulating spacer 17, the first gas chamber 15, the second gas chamber 16, and three adsorbents 14 in the gas-insulated switchgear apparatus according to the fourth embodiment have an identical structure to those according to the second embodiment. Hence, description of the identical constituent elements is not repeated.

The gas-insulated switchgear apparatus further includes a bypass piping 11 arranged to bypass the first gas chamber 15 and the second gas chamber 16. The first gas chamber 15 and the second gas chamber 16 are partitioned by the insulating spacer 17. The bypass piping 11 includes a gas valve 10, a gas filter device 9, and one adsorbent 14. The gas filter device 9 has an identical structure to that according to the first embodiment. The adsorbent 14 is identical to that according to the second embodiment and adsorbs the cracked gas.

Identical to the second embodiment, no foreign objects can pass through a gas filter 1 of the gas filter device 9 according to the fourth embodiment. Although the cracked gas is able to pass through the gas filter 1, the adsorbent 14 in each of the first gas chamber 15 and the second gas chamber 16 adsorbs the cracked gas. Thus, passing of the cracked gas through the gas filter 1 does not cause much problem unless the cracked gas is extremely concentrated.

However, if a cracked gas of high concentration is generated due to an accident in, e.g., the first gas chamber 15, it may not be possible for the adsorbent 14 in each of the first gas chamber 15 and the second gas chamber 16 to absorb all the cracked gas. In anticipation of such a situation, an additional adsorbent 14 is arranged in the bypass piping 11 such that the un-adsorbed cracked gas gets adsorbed by that adsorbent 14. Such a configuration enables to isolate the first gas chamber 15 and confine the appropriate gas treatment thereto.

Figure 6:
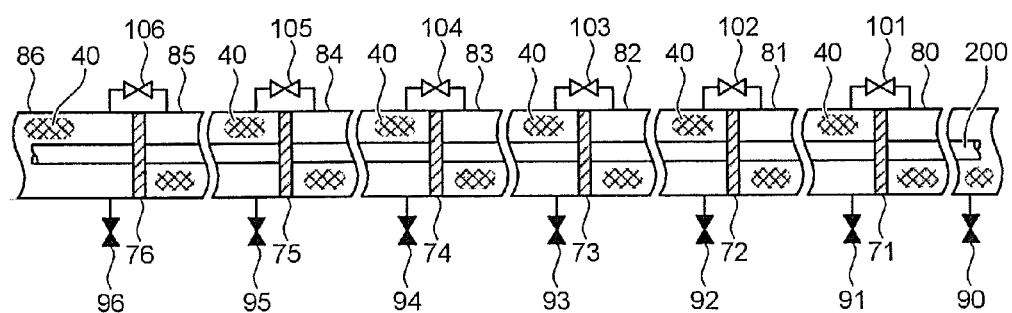
FIG. 6 is a gas schematic diagram of a conventional gas-insulated switchgear apparatus.

Meanwhile, FIG. 6 is a gas schematic diagram of a conventional gas-insulated switchgear apparatus disclosed in Japanese Patent Application Laid-open No. H5-91631. The conventional gas-insulated switchgear apparatus includes a plurality of metallic chambers 80 to 86 that are connected by a plurality of valves 101 to 106 and partitioned by a plurality of insulating spacers 71 to 76. One of a plurality of gas valves 90 to 96 is connected to each of the metallic chambers 80 to 86. A conductor 200 passes through the metallic chambers 80 to 86 and the insulating spacers 71 to 76. An insulating gas 40 is filled in each of the metallic chambers 80 to 86.

The gas valves 90 to 96 are usually kept closed and are opened when the conventional gas-insulated switchgear apparatus is connected to a gas filling apparatus or a gas evacuating apparatus through a gas pipe for filling or evacuating the insulating gas 40.

A bypass piping is arranged to perform central monitoring of the gas pressure in two or more of the metallic chambers 80 to 86. The bypass piping includes the valves 101 to 106, each of which is arranged between a separate pair of neighboring metallic chambers from among the metallic chambers 80 to 86. Each of the valves 101 to 106 is usually kept open during the central monitoring but is closed when the gas pressure in each of the metallic chambers 80 to 86 is to be monitored individually.

However, while filling the insulating gas 40, there is a possibility that foreign objects accumulated in the gas pipe enter in the conventional gas-insulated switchgear apparatus thereby causing an insulation breakdown.

Moreover, if, e.g., a grounding fault occurs in one of the metallic chambers 80 to 86, there is a possibility that foreign objects, decomposition product, and a cracked gas of the insulating gas 40 generated in the faulty metallic gas chamber flow into the neighboring metallic chambers through the bypass piping. That is because the valves in the bypass piping are usually kept open. As a result, it becomes necessary to carry out the appropriate gas treatment in all the contaminated metallic chambers.

However, according to the abovementioned embodiments of the present invention, the gas filter device 9, the first gas filter device 9a, and the second gas filter device 9b are fixed to the gas-insulated switchgear apparatus such that foreign objects are prevented from entering into the gas-insulated switchgear apparatus thereby avoiding a possible insulation breakdown.

Thus, according to an aspect of the present invention, it is possible to prevent foreign objects from entering in a gas-insulated switchgear apparatus while filling therein an insulted gas. As a result, a possible insulation breakdown can be avoided.

Moreover, even if an accident occurs in a gas chamber of the gas-insulated switchgear apparatus, foreign objects such as decomposition product or electrically conductive materials generated due to the accident do not enter into a neighboring gas chamber. That is because a gas filter device and a gas valve in a bypass piping of the gas-insulated switchgear apparatus prevent foreign objects from passing therethrough. As a result, the appropriate gas treatment remains confined to the faulty gas chamber.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gas-insulated switchgear apparatus comprising:
   an electrically grounded gas tank that is hermetically filled with an insulating gas;
   a gas filling opening provided on the gas tank, the gas filling opening including a gas flange at its end; and
   a gas filter device that is fixed to the gas flange of the gas filling opening provided on the gas tank, the gas filter device including first and second plates together forming a gas flow through-hole extending in a flow direction, and a gas filter pressed between the first and second plates in the flow direction and extending across the gas flow through-hole, and further including a gas filter formed with a porous insulating material having pores with a diameter in a range from tens of micrometers to hundreds of micrometers, wherein the gas filter has stability against the insulating gas and a decomposition gas of the insulating gas, and the pressing of the gas filter between the first and second plates is effected through first and second seal rings, respectively, the first seal ring disposed between the gas filter and the first plate, and the second seal ring disposed between the gas filter and the second plate, the first and second seal rings extending around the gas flow through-hole.

2. The gas-insulated switchgear apparatus according to claim 1, wherein the gas filter is a sintered resin filter of an insulating resin.

3. The gas-insulated switchgear apparatus according to claim 2, wherein the insulating resin is polypropylene.

4. The gas-insulated switchgear apparatus according to claim 1, further including fasteners interconnecting the first and second plates to urge the first and second plates toward one another.

5. A gas-insulated switchgear apparatus comprising:
an electrically grounded gas tank that is hermetically filled with an insulating gas;
a conductor that is arranged inside the gas tank;
a gas partitioning spacer that partitions the gas tank into a plurality of gas chambers along a longitudinal direction of the conductor and provides an insulating support to the conductor;
a bypass piping that connects neighboring gas chambers to each other;
a gas valve that is arranged in the bypass piping; and
a gas filter device that is fixed to a gas flange of a gas filling opening provided on the gas tank, the gas filter device including first and second plates together forming a gas flow through-hole extending in a flow direction, and a gas filter pressed between the first and second plates in the flow direction and extending across the gas flow through-hole, and further including a gas filter formed with a porous insulating material having pores with a diameter in a range from tens of micrometers to hundreds of micrometers, wherein the gas filter has stability against the insulating gas and a decomposition gas of the insulating gas, and the pressing of the gas filter between the first and second plates is effected through first and second seal rings, respectively, the first seal ring disposed between the gas filter and the first plate, and the second seal ring disposed between the gas filter and the second plate, the first and second seal rings extending around the gas flow through-hole.

6. The gas-insulated switchgear apparatus according to claim 5, wherein each of the gas chambers includes a first adsorbent for adsorbing the decomposition gas of the insulating gas.

7. The gas-insulated switchgear apparatus according to claim 6, wherein the bypass piping includes a second adsorbent for adsorbing the decomposition gas of the insulating gas.

8. The gas-insulated switchgear apparatus according to claim 5, wherein the gas filter is a sintered resin filter of an insulating resin.

9. The gas-insulated switchgear apparatus according to claim 8, wherein the insulating resin is polypropylene.

10. The gas-insulated switchgear apparatus according to claim 5, further including fasteners interconnecting the first and second plates to urge the first and second plates toward one another.

11. A gas filter device that is used in a gas-insulated switchgear apparatus at a time of filling an insulating gas, the gas filter device being fixed to a gas flange that is arranged at a gas filling opening of the gas-insulated switchgear apparatus, the gas filter device comprising:
a gas filter that is formed with a porous insulating material having pores with a diameter in a range from tens of micrometers to hundreds of micrometers, the gas filter having stability against the insulating gas and a decomposition gas of the insulating gas;
a first plate that is substantially identical in shape to the gas flange;
a second plate that is substantially identical in shape to the gas flange;
a plurality of O-rings used as gaskets; and
a plurality of bolts used as fasteners, wherein
the gas filter is pressed between the first plate and the second plate through the O-rings, and
the first plate and the second plate are fastened in an airtight manner by the bolts which interconnect the first and second plates.

12. The gas filter device according to claim 11, wherein the gas filter is a sintered resin filter of an insulating resin.

13. The gas filter device according to claim 12, wherein the insulating resin is polypropylene.

* * * * *